Oct. 26, 1954     E. C. STEINER     2,692,621
CARCASS SPLITTING SAW
Filed Aug. 18, 1948                                    2 Sheets-Sheet 1
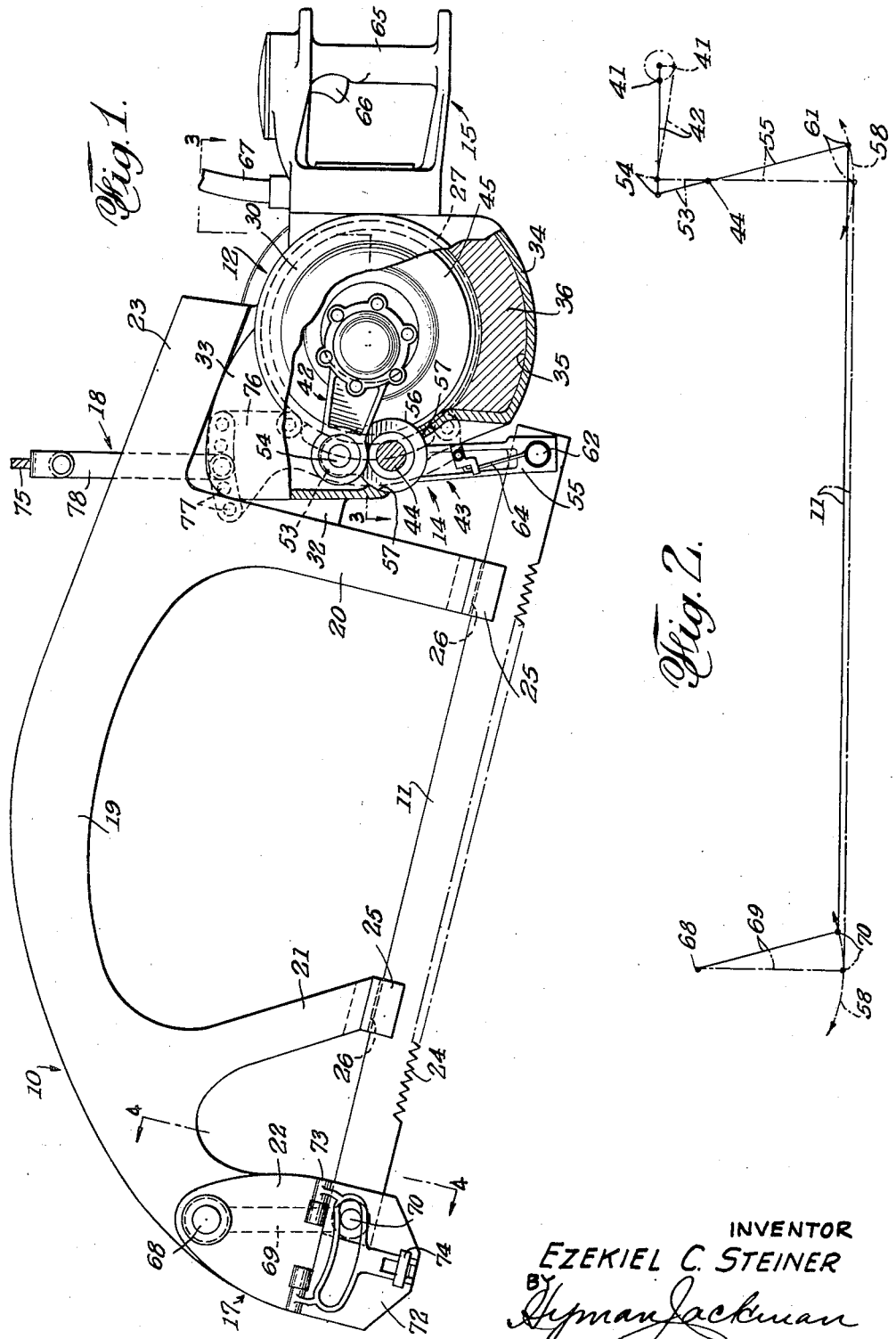
INVENTOR
EZEKIEL C. STEINER
BY
*Hyman Jackman*
ATTORNEY Oct. 26, 1954  E. C. STEINER  2,692,621
CARCASS SPLITTING SAW
Filed Aug. 18, 1948  2 Sheets-Sheet 2
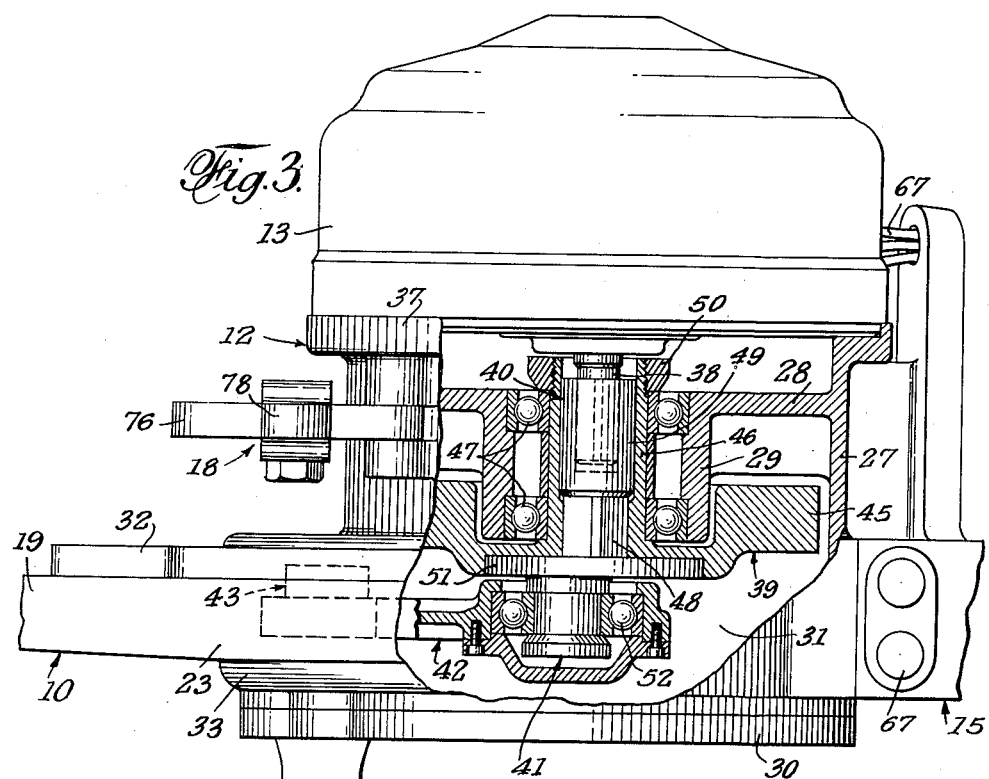
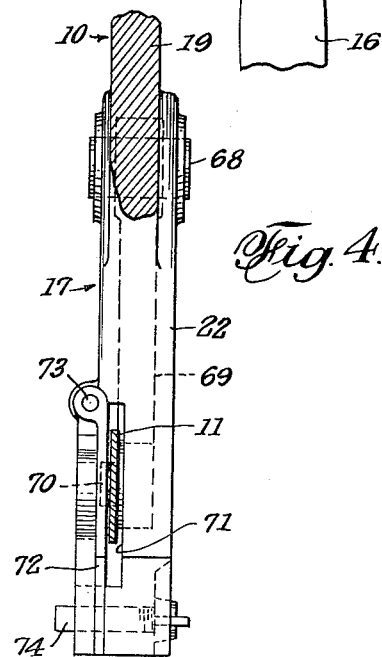
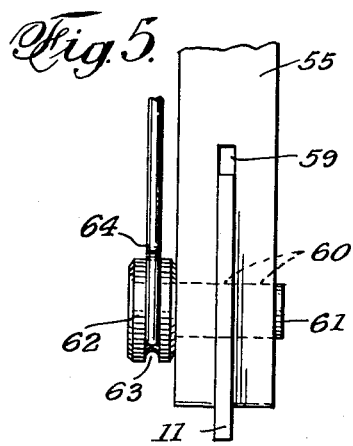
INVENTOR
EZEKIEL C. STEINER
BY Hyman Jackman
ATTORNEY Patented Oct. 26, 1954

2,692,621

UNITED STATES PATENT OFFICE 2,692,621

CARCASS SPLITTING SAW

Ezekiel C. Steiner, Los Angeles, Calif.

Application August 18, 1948, Serial No. 44,943

6 Claims. (Cl. 143—68)

This invention relates to a power rump bone and carcass splitting saw.

In slaughter and packing houses, after a carcass is partly dressed it is hung by the rear legs and moved by suitable conveying means past a splitting station. At this point, a splitter according to the present invention is used for dividing the carcass along the back bone thereof, the divided carcass then being further dressed in a conventional manner. Saw splitters now in use have the important disadvantage of "saw burning," charring, and so affecting the cut surfaces of the carcass as to induce mold formations thereon. Skillful hand-axe splitting obviates these faults but is seldom used because the same is a laborious and uneconomical operation.

Seeking to obviate the faults of conventional carcass splitters, an object of the present invention is to provide a saw of the character indicated that splits a carcass in a manner that is comparable to hand-axe splitting.

Another object of the invention is to provide a carcass splitting saw that embodies novel means for mounting a saw blade for facile installation and removal, the same being accomplished without tools.

Another object of the invention is to provide novel drive means for the saw blade whereby the movement of said blade is smooth, resulting in a substantially vibrationless operation.

A further object of the invention is to provide improved counterbalancing means affording flexibility in use according to the preferences of different operators.

The invention also has for its objects to provide such means that are positive in operation and convenient in use, economical of manufacture, and of general superiority and serviceability.

The invention also comprises novel details of construction and novel combinations and arrangements of parts, which will more fully appear in the course of the following description. The accompanying drawings, however, merely show and the description merely describes a preferred embodiment given by way of example only.

In said drawings:

Fig. 1 is a side elevational view, partly broken away, of a rump bone and carcass splitting saw according to the present invention.

Fig. 2 is a diagrammatic view showing the saw blade mounting and driving means.

Fig. 3 is an enlarged plan view, partly broken away, of the motor and saw blade drive means of the splitter, the same being taken, generally, on line 3—3 of Fig. 1.

Fig. 4 is a similarly enlarged cross-sectional view on line 4—4 of Fig. 1.

Fig. 5 is a further enlarged fragmentary view illustrating the mounting of one end of the saw blade.

The present splitting saw comprises, generally, a saw yoke 10, a saw blade 11 guided by said yoke, a housing 12 secured to one end of the yoke, an electric motor 13, of the pancake type, mounted on the housing, drive means 14 connected to one end of the saw blade within the housing and coupled with the motor, handle and control means 15 extending rearward of the housing, a steadying handle 16 extending laterally from the housing, means 17 on the outboard end of the yoke for mounting the other end of the saw blade and adjustable means 18 for suspending the splitting saw in desired balanced disposition.

The saw yoke 10 is suitably made of a heat treated aluminum alloy for lightness, strength and rigidity. Said yoke integrally, comprises a curved spine 19 that extends longitudinally, with a downreaching rear leg 20 and a forwardly spaced downreaching and rearwardly angled leg 21. The forward end of the yoke spine comprises a housing 22 for the means 17 and the same, has an extension 23 rearward of leg 20.

The saw blade 11 is a simple flat member of uniform width throughout its length and with teeth 24 in one edge thereof. Said saw blade is generally coextensive with the yoke and is guided for movement in blocks 25 that are replaceably secured to the ends of legs 20 and 21 and are slotted, as at 26, to receive and guide the saw blade for free movement of the latter. The saw blade being preferably of steel, said blocks, for friction-reducing engagement, are made of bronze that may be nickelplated.

The housing 12 is preferably in the form of a casting that has a tubular wall 27 and, adjacent the motor side, is provided with a transverse wall 28 having a central tubular boss 29. The opposite side of the housing is open and fitted with a removable cover plate 30 on which the steadying handle 16 is either integrally cast or fixedly secured. Between wall 28 and cover plate 30, there is formed a chamber 31 that houses a portion of means 14.

The housing is integrally formed with a bracket extension 32 that is connected by suitable bolts or screws with the extension 23 and the upper portion of leg 20 of the saw frame, the housing thus comprising a rigid rearward extension of said saw frame. Partially extensive with extension 32 and adjacent the cover plate, the tubular wall 27 is formed with a bulge 33 to enlarge chamber 31 for portions of the means 14. Also, the lower portion of said tubular wall is downwardly bulged as at 34 to form a pocket 35 receptive of molten lead 36 which, in its solid form, comprises a counterweight for the saw splitter The housing formed in this manner, comprises a neat and trim enclosure for the means 14 and for the counterweight 36.

The motor 13 is generally conventional, although of the pancake type, and is suitably bolted to the flange 37 of housing 12 so that its shaft 38 extends axially into boss 29.

The saw-driving means 14, generally comprises a flywheel 39 in the housing, a quill 40 interconnecting the flywheel and the motor shaft, an eccentric stud 41 on the face of the flywheel, a pitman or connecting rod 42 connected at one end to stud 41 to generate a crank motion, and a bellcrank or rack lever 43, pivoted to the housing at 44, and connected to the other end of the pitman and generating a rocking motion under control of the pitman.

The flywheel is formed with a balanced felly 45 rotating in the housing and the same is provided with a tubular hub 46 that extends through the tubular boss 29 of the housing. Anti-friction bearings 47, that preferably embody their own lubrication, mount the flywheel for rotation in the housing.

The bore of the flywheel hub 46 is, in part polygonal to receive the polygonal end 48 of quill 40. The latter is formed with a tubular part 49 that receives and is keyed to, motor shaft 38. The flywheel is held in place by a nut 50 which also serves to position bearings 47. Thus, after the flywheel is assembled, it is a simple matter to slip the quill into the hub thereof and apply the motor to the housing to effect a drive connection between said motor and flywheel. Said flywheel, of course being designed to develop kinetic energy that smooths out the operation of the pitman and bellcrank and thereby minimizes vibration in the device.

The stud 41 may be an integral part of the flywheel, but the same is preferably formed as an eccentric on a plate 51 affixed to the face of the flywheel.

The pitman 42 is formed as a crank and is connected, by an anti-friction bearing 52, to the stud 41. Thus, as the flywheel rotates, said pitman generates a circular motion at one end. This bearing 52 is also self-lubricated.

The bellcrank lever 43 is formed with an arm 53 that is connected with the pitman at 54, said arm residing in chamber 31, and with a longer arm 55 that extends downwardly and outside of chamber 31. The pivot 44 for said bellcrank is also provided with an anti-friction bearing and the hub 56 surrounding said bearing is formed with a smooth cylindrical outer face for sealing engagement with bearing edges 57 on the peripheral wall of the housing. The entrance of foreign matter into housing chamber 31 is thereby obviated. The end 54 of arm 53 is given a rocking motion around pivot 44 by the pitman, resulting in a similar but larger motion of the free end of longer arm 55. It will be seen that this motion of arm 55 is in the form of an arc 58 as best illustrated in Fig. 2.

Said free end of arm 55, as shown in Figs. 1 and 5, is slotted at 59 to receive an end of saw blade 11, and registering holes 60 in said arm and blade serve to receive a connecting pin 61. The latter is formed with a head 62 having an annular groove 63 in the periphery thereof. The pin is readily removable and is retained in connecting position by a spring wire 64 engaged in groove 63 and fixed to arm 55. It is evident that the blade cannot become inadvertently disconnected from the arm but can be easily removed for replacement by rearwardly flexing spring 64 and extracting pin 61.

The handle means 15 may include a hand grip 65, a trigger 66 thereon for instituting operation of the motor, and the necessary electrical connections 67 for said motor.

The housing 22 of means 17, near its upper end, is provided with a transverse pivot pin 68 for an arm 69 similar in length to that of arm 55. The free end of arm 69 carries a stud 70 for engagement in a hole formed in the end of the saw blade, the latter extending into housing 22 through a slot 71. Access is had to the interior of said housing by raising a cover 72 hinged at 73, thus making connection and disconnection of arm 69 and the saw blade relatively easy. A turn-bolt type of lock 74 is provided for holding cover 72 closed during operation.

From Fig. 2 it will be seen that the rotary motion of the fly wheel is translated in an arcuate motion of arms 55 and 69 and that the saw blade connected between and carried by said arms both reciprocates and moves in an arc. The motion of the blade is thus best described as oscillatory. It will be evident that, in operation, the blade teeth are not in full cutting engagement with a carcass—such an engagement causing the deleterious results above stated—but progressively cut into the carcass, until the low point of arc 58 is reached, and then progressively tend to ease out of the cut at each end or high point of said arc.

The present splitter is suspended from a cable or wire 75 that connects through means 18 with housing 12. Said means 18 includes a bracket 76 that is secured to wall 27 of the housing and is provided with a series of selective holes 77 for connection with a link 78 to which cable 75 is affixed. It will be seen that the suspension of the device is arranged to have the counterweighted housing and motor on one side and the yoke 10 on the other side, in the manner of a balance and that said balance can be adjusted by selection of holes 77. In any position of balance, the saw blade still has is oscillatory movement.

While this disclosure is based on a preferred embodiment of the invention, the construction is, of course, subject to modifications without departing from the spirit and scope of the invention, as defined in the appended claims.

I claim:

1. A carcass splitting saw comprising a housing, a rigid yoke extending substantially laterally from said housing, spaced relatively fixed pivots, one in the housing and one at the outer end of the yoke, an arm on each pivot, a saw blade extending between and having its ends pivotally connected to the ends of said arms, saw-guiding means extending from and integral with the yoke between the mentioned arms, a rotary motor carried by the housing, and means within the housing and interconnecting the motor and the arm pivoted on the housing to convert the rotary movement of the former to arcuate oscillatory movement of the latter, the oscillatory movement of said arm producing arcuate reciprocating movement of the saw blade and arcuate oscillatory movement of the arm at the outer end of the yoke.

2. A carcass splitting saw according to claim 1: a bellcrank extension on the arm pivoted in the housing, said movement-converting means comprising an eccentric driven by the motor, and a pitman interconnecting the eccentric and said bellcrank.

3. A splitting saw comprising a housing, a motor extending from one side of the housing and having a shaft, means including an arm on a fixed pivot in said housing for converting rotary motion of said shaft to arcuate oscillating motion of the free end of said arm, a saw yoke extending from the housing, a second arm on a fixed pivot at the end of said yoke, said arms being the same length, and a saw blade extending between the ends of said arm and pivotally connected to said arms and movable in an arcuate oscillatory path.

4. In a carcass splitting saw, a pair of longitudinally spaced relatively fixed pivots, an arm on each pivot, said arms being equal in length, a saw blade extending between the free ends of the arms and pivotally connected thereto, the length of the saw blade between the latter pivots being substantially equal to the longitudinal spacing of the fixed pivots, and power means to oscillate one of the arms on its pivot to, thereby, move the blade in an arcuate oscillatory path and move the other arm on its pivot in an oscillatory path the same as that of the first arm.

5. A splitting saw comprising a housing, a motor extending from one side of said housing and having a rotational shaft, means including an arm on a fixed pivot in said housing to convert rotary motion of said shaft to arcuate oscillating motion of the free end of said arm, a saw yoke rigidly extending from said housing, a second arm on a fixed pivot at the end of said yoke, said arms being the same length, a pivot at the free end of each arm, a saw blade connected to and extending between latter pivots, the length of the saw blade between said pivots being substantially equal to the distance between the fixed pivots of the arms, and a pair of guides extending from the yoke between said arms and engaging the saw blade to guide the same.

6. In a splitting saw having a rigid yoke and a power-driven arm mounted on a fixed pivot at one end of said yoke to move in an arcuate oscillatory path, a second arm equal in length to the first arm and mounted on a fixed pivot at the opposite end of said yoke, a pivot at the free end of each said arm, a saw blade connected to and extending between the latter pivots, the length of the saw blade between said latter pivots being substantially equal to the spacing between the pivots on which the arms are mounted, said arms, thereby, being parallel and the movement of the first arm being transmitted by the saw blade to the second arm, and said blade bodily moving in a uniform arcuate and oscillatory path.

References Cited in the file of this patent

UNITED STATES PATENTS

| Number | Name | Date |
| --- | --- | --- |
| 181,966 | Oliver | Sept. 5, 1876 |
| 867,322 | Walker | Oct. 1, 1907 |
| 1,266,355 | Urbanski | May 14, 1918 |
| 1,617,410 | Meyer | Feb. 15, 1927 |
| 1,643,721 | Meyer | Sept. 27, 1927 |
| 1,752,257 | Harrington | Mar. 25, 1930 |
| 2,178,476 | Grahek | Oct. 31, 1939 |
| 2,327,167 | Bratek et al. | Aug. 17, 1943 |